United States Patent [19]

Stephens

[11] Patent Number: 5,394,138
[45] Date of Patent: Feb. 28, 1995

[54] VEHICLE WARNING SYSTEM

[76] Inventor: Douglas R. Stephens, 2015 E. University Dr., Unit 10, Tempe, Ariz. 85281

[21] Appl. No.: 169,408

[22] Filed: Dec. 20, 1993

[51] Int. Cl.⁶ .............................................. B60Q 1/22
[52] U.S. Cl. ..................................... 340/463; 340/471; 362/80.1
[58] Field of Search ...................... 340/463, 425.5, 457, 340/471, 472, 475, 485, 461; 362/80.1, 83.1; 116/42, 28 R

[56] References Cited

U.S. PATENT DOCUMENTS

| | | | |
|---|---|---|---|
| 3,665,392 | 5/1972 | Annas | 362/80.1 |
| 4,763,234 | 8/1988 | Scott | 340/485 |
| 4,847,589 | 7/1989 | Dobbins | 340/471 |
| 5,025,245 | 6/1991 | Barke | 340/471 |
| 5,253,115 | 10/1993 | Ueno | 340/475 |

FOREIGN PATENT DOCUMENTS 4071938  3/1992  Japan .................................. 340/463

*Primary Examiner*—Brent Swarthout

[57] ABSTRACT

A new and improved vehicle warning system for warning on-coming motorists of an important road condition such as a police checkpoint or an accident ahead of them, and the approximate distance to the road condition, by use of a visual signalling device attached inside the windshield of the signaller's vehicle, the vehicle warning system comprising an electrical circuit assembly having a plurality of front-facing different colored annunciator lamps thereon, the circuit assembly also having rear facing switch means for activating or deactivating one or more of the annunciator lamps, an enclosure for housing the circuit assembly, a clamp for removedly securely attaching the enclosure to a vehicle's inside rear-view mirror so the lamps are visible to oncoming vehicles through the windshield, and a source of electrical energy to power the lamps.

2 Claims, 4 Drawing Sheets

VEHICLE WARNING SYSTEM

BACKGROUND OF THE INVENTION

1. Field of the Invention

The present invention relates to inter-vehicular signalling devices and more particularly pertains to vehicle warning systems which may be used for warning on-coming motorists of an important road condition such as a police checkpoint or an accident ahead of them, and the approximate distance to the road condition, by use of a visual signalling device attached inside the windshield of the signaller's vehicle.

2. Description of the Prior Art

The use of vehicle warning systems is known in the prior art. More specifically, vehicle warning systems heretofore devised and utilized for the purpose of warning on-coming motorists of an important road condition such as a police checkpoint or an accident ahead of them, and the approximate distance to the road condition, by use of a visual signalling device attached inside the windshield of the signaller's vehicle are known to consist basically of familiar, expected and obvious structural configurations, notwithstanding the myriad of designs encompassed by the crowded prior art which have been developed for the fulfillment of countless objectives and requirements.

The present invention is directed to improving devices for warning on-coming motorists of an important road condition such as a police checkpoint or an accident ahead of them, and the approximate distance to the road condition, by use of a visual signalling device attached inside the windshield of the signaller's vehicle in a manner which is safe, secure, economical and aesthetically pleasing.

For example, U.S. Pat. No. 4,574,269 to Miller discloses a vehicle communicator consisting of a rear window-mounted light emitting diode matrix having a set of pre-programmed messages selectable from a control center. The invention disclosed requires considerable attention from an operator when selecting messages to be displayed which could be hazardous if the operator is also the driver of the vehicle.

U.S. Pat. No. 5,010,670 to Minervini describes an automobile window display apparatus which includes a pivotally mounted rear window display panel which may be alternately moved between a retracted and a vertical display position by means of a cord attached to the lower edge of the panel extending forwardly and hooked onto the rear view mirror mount. A multiple purpose vehicle signal device is shown in U.S. Pat. No. 3,800,430 to Samra which consists of visual signal device for vehicles adapted to be selectively mounted inside or outside the vehicle and controlled from the driver's seat to beam an otherwise inconspicuous interchangeable signal indicia providing an advance warning to traffic or pedestrians in a flashing, conspicuous manner. Both the devices described above have very limited usefulness because only a single fixed message may be placed on the display panel at any one time. Also, both the inventions described can be effective only when viewing from the rear when used in high-speed highway driving because of the very small viewing window of opportunity associated with fast moving oncoming vehicles.

The prior art also discloses a multi colored light signal for vehicles as shown in U.S. Pat. No. 4,020,335 to Bisceglia which consists of a light structure for antenna type mountable on vehicles for visibility from any direction, the light being a direct lineal extension of the antenna mast or shaft consisting of a clear plastic tube wrapped in various colored film along its length and embraced by translucent light diffusing bodies separated by opaque dividers and associated with internal lamps for illuminating each colored zone along its length powered by a suitable source of electrical energy in a switch controlled circuit. The invention disclosed does not show a way to communicate distance-to-hazard information to the oncoming driver.

In this respect, the vehicle warning system according to the present invention substantially departs from the conventional concepts and designs of the prior art, and in so doing provides an apparatus primarily developed for the purpose of warning on-coming motorists of an important road condition such as a police checkpoint or an accident ahead of them, and the approximate distance to the road condition, by use of a visual signalling device attached inside the windshield of the signaller's vehicle.

Therefore, it can be appreciated that there exists a continuing need for new and improved vehicle warning systems which can be used for warning on-coming motorists of an important road condition such as a police checkpoint or an accident ahead of them, and the approximate distance to the road condition, by use of a visual signalling device attached inside the windshield of the signaller's vehicle. In this regard, the present invention substantially fulfills this need.

As illustrated by the background art, efforts are continuously being made in an attempt to develop devices for warning on-coming motorists of an important road condition such as a police checkpoint or an accident ahead of them, and the approximate distance to the road condition, by use of a visual signalling device attached inside the windshield of the signaller's vehicle. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of vehicle warning system now present in the prior art, the present invention provides an improved vehicle warning system construction wherein the same can be utilized for warning on-coming motorists of an important road condition such as a police checkpoint or an accident ahead of them, and the approximate distance to the road condition, by use of a visual signalling device attached inside the windshield of the signaller's vehicle. As such, the general purpose of the present invention, which will be described subsequently in greater detail, is to provide a new and improved vehicle warning system apparatus and method which has all the advantages of the prior art vehicle warning system and none of the disadvantages.

The invention is defined by the appended claims with the specific embodiment shown in the attached drawings. For the purpose of summarizing the invention, the invention may be incorporated into a new and improved vehicle warning system for warning on-coming motorists of an important road condition such as a police checkpoint or an accident ahead of them, and the approximate distance to the road condition, by use of a visual signalling device attached inside the windshield of the signaller's vehicle. The vehicle warning system comprises an electrical circuit assembly having a plurality of front-facing different colored daylight-visible annunciator lamps thereon. The circuit assembly also has timer means for controlling the sequence and duration of the periods of lamp illumination. The circuit assembly additionally has rear facing switch means for actuating or disabling the timer means. An enclosure means for housing the circuit assembly is included. The enclosure means comprises a hollow cabinet having a top, sides, and a bottom, The cabinet has an angled open front approximately coplanar with a motor vehicle windshield whereby a hood is formed to shield annunciator lamp glare from a driver's eyes when the cabinet is mounted in a level position facing the inside of the windshield. The cabinet additionally has an open back and a means for mounting the circuit assembly. Also included is a front panel having a plurality of openings therethrough wherethrough the annunciator lamps are visible to an observer located in front of the device and a rear panel having openings therethrough whereby an operator may activate the switch means. The vehicle warning system further includes clamp means for removedly securely attaching the enclosure to a vehicle's inside rear-view mirror so the angled cabinet front is in close proximity to and approximately coplanar with the inside surface of the vehicle's windshield. An electrical power cable is operably connected from the electrical circuit assembly to a source of electrical power such as the vehicle's electrical system.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved vehicle warning system for warning on-coming motorists of an important road condition such as a police checkpoint or an accident ahead of them, and the approximate distance to the road condition, by use of a visual signalling device attached inside the windshield of the signaller's vehicle, the vehicle warning system comprising an electrical circuit assembly having a plurality of front-facing different colored annunciator lamps thereon, the circuit assembly also having rear facing switch means for activating or deactivating one or more of the annunciator lamps, an enclosure for housing the circuit assembly, a clamp for removedly securely attaching the enclosure to a vehicle's inside rear-view mirror so the lamps are visible to oncoming vehicles through the windshield, and a source of electrical energy to power the lamps.

An even further object of the present invention is to provide a new and improved vehicle warning system which is susceptible of a low cost of manufacture with regard to both materials and labor, and which accordingly is then susceptible of low prices of sale to the consuming public, thereby making such vehicle warning system s economically available to the buying public.

Still yet another object of the present invention is to provide a new and improved vehicle warning system which provides in the apparatuses and methods of the prior art some of the advantages thereof, while simultaneously overcoming some of the disadvantages normally associated therewith.

Still yet another object of the present invention is to provide a new and improved vehicle warning system which may be easily concealed and rapidly deployed by the driver of a vehicle in motion without causing a dangerous driving distraction.

Yet another object of the present invention is to provide a new and improved vehicle warning system that is readily seen by oncoming drivers even in bright daylight.

Even still another object of the present invention is to provide a new and improved vehicle warning system which enables the operator to provide oncoming motorists with an approximate distance to the event of which they are being warned.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
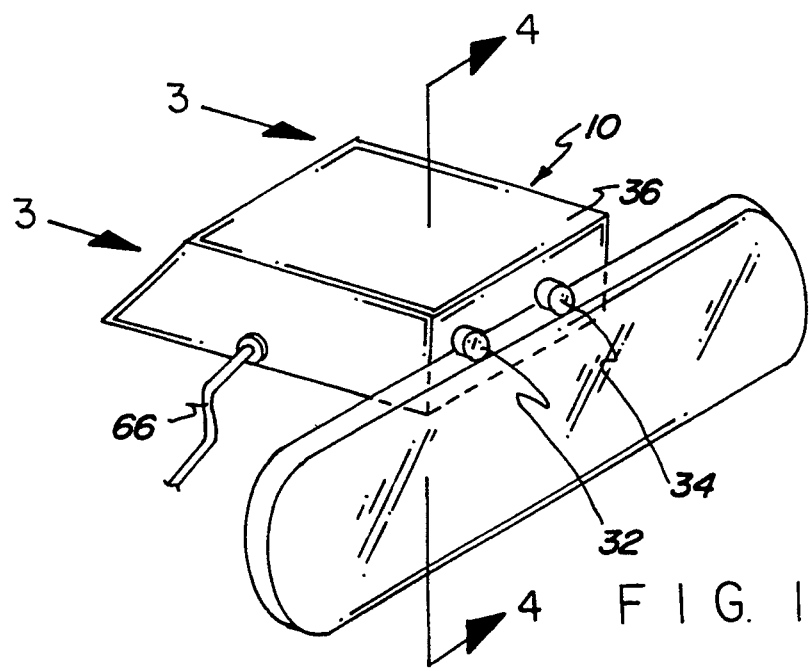
FIG. 1 is a perspective view of the invention as would be seen by the operator, shown mounted to the inside rear-view mirror of a vehicle.
Figure 2:
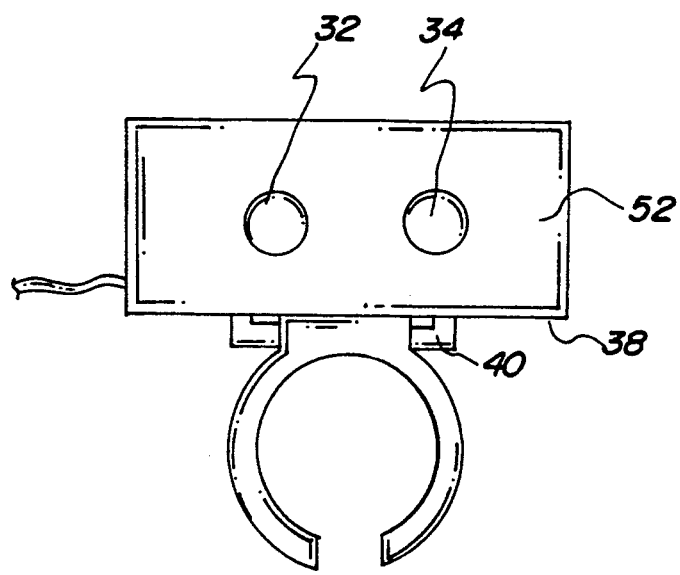
FIG. 2 is a rear plan view of the device showing the rear panel, lamp actuator switches, and the mounting clamp.
Figure 3:
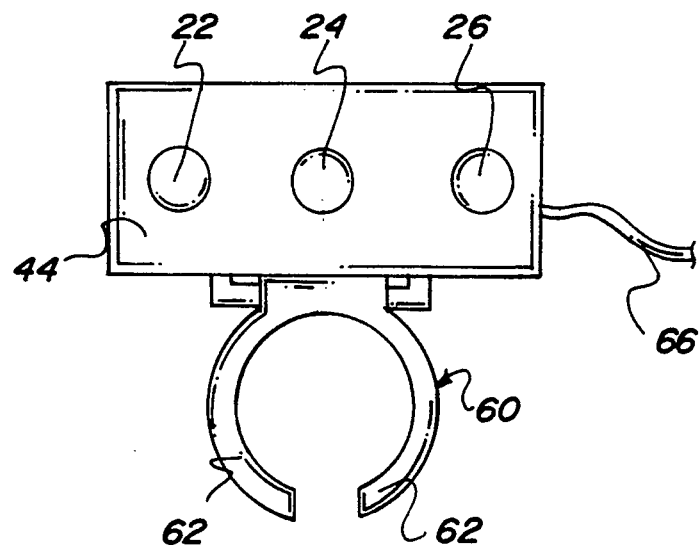
FIG. 3 is a front plan view of the invention showing the front panel, three different colored annunciator lamps, and the mounting clamp.
Figure 4:
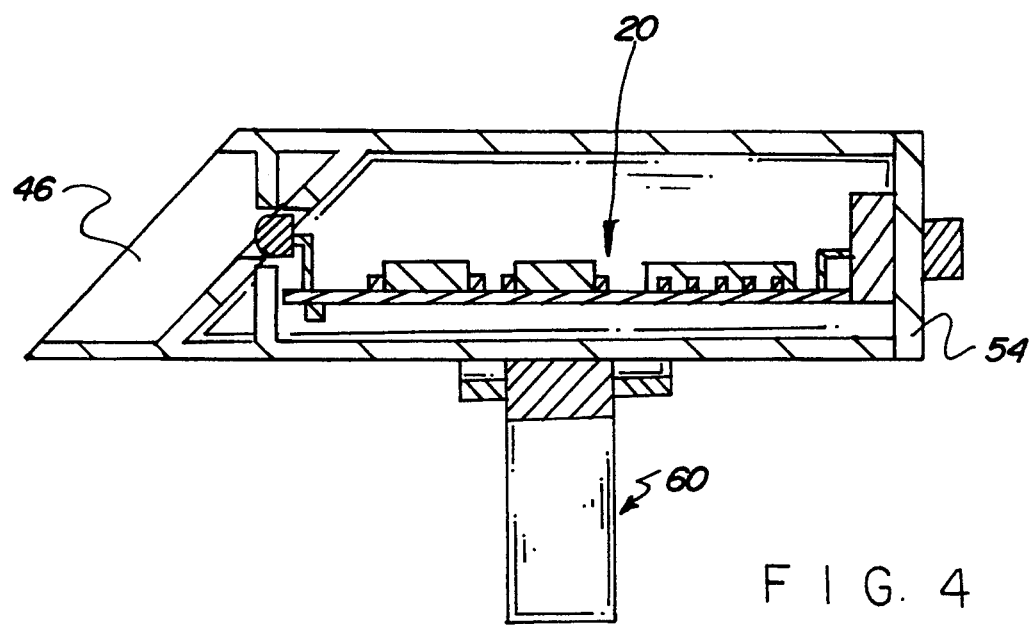
FIG. 4 is a sectional view of the invention of FIG. 1 taken along the line 4—4.
Figure 5:
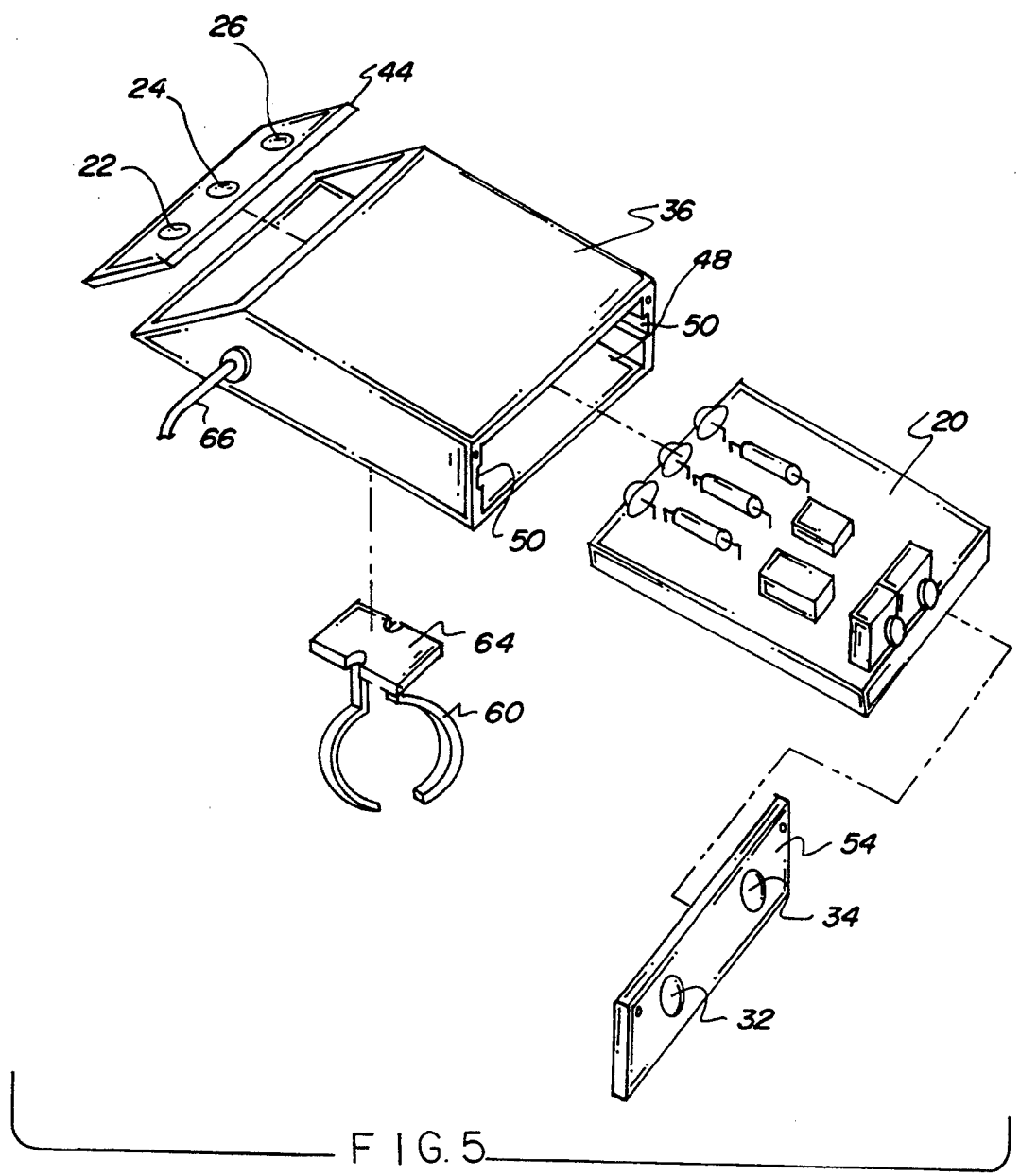
FIG. 5 is an exploded view of the invention.

With reference now to the drawings, and in particular to FIG. 1 thereof, a new and improved vehicle warning system embodying the principles and concepts of the present invention and generally designated by the reference numeral 10 will be described.

From an overview standpoint, the vehicle warning system is adapted for use to warn on-coming motorists of an important road condition such as a police checkpoint or an accident ahead of them, and the approximate distance to the road condition, by use of a visual signalling device attached inside the windshield of the signaller's vehicle. See FIG. 1.

With reference now to FIGS. 1 through 5, more specifically, it will be noted that a vehicle warning system 10 for warning on-coming motorists of an important road condition such as a police checkpoint or an accident ahead of them, and the approximate distance to the road condition, by use of a visual signalling device attached inside the windshield of the signaller's vehicle. The vehicle warning system 10 comprises an electrical circuit assembly 20 having a plurality of front-facing different daylight-visible annunciator lamps 22, 24, and 26 thereon. The circuit assembly also has timer means 48 for controlling the sequence and duration of the periods of lamp illumination.

The circuit assembly additionally has two rear facing manual switches 32 and 34 for actuating and disabling the timer means. An enclosure for housing the circuit assembly 20 is included. The enclosure comprises a hollow cabinet 36 having a top and sides. The cabinet also has a planar bottom 38 with a central integral mounting shoe 40 formed externally thereon. The shoe comprises a pair of downwardly projecting spaced apart longitudinal ears formed on the outside planar surface of the cabinet bottom, the ears each having a horizontal lip formed along the lower edge, the lips extending slightly inwardly toward each other whereby a mounting channel is formed.

The cabinet has an angled open front 44 approximately coplanar with a motor vehicle windshield (not shown) whereby a hood 46 is formed to shield annunciator lamp glare from a driver's eyes when the cabinet is mounted in a level position facing the inside of the windshield. The cabinet additionally has an open back. The cabinet further has two spaced apart facing slots 50 formed on the inside of the sides for slippedly receiving the circuit assembly. Also included is a planar front panel having a plurality of openings therethrough wherethrough the annunciator lamps 22, 24, and 26 are visible to an observer located in front of the device 10, and a rear panel 54 having openings therethrough whereby an operator may activate the switches 32 and 34.

The vehicle warning system 10 further includes clamp 60 for removedly snapidly attaching the enclosure to a vehicle's inside rear-view mirror, the cabinet being positioned so the angled cabinet front is in close proximity to, and approximately coplanar with, the inside surface of the vehicle's windshield (not shown). The clamp comprises two arcuate resilient spaced apart inwardly-facing jaw members 62 which define a clamping zone therebetween wherein the mounting post of the vehicle's inside rear-view mirror may be snapidly releasedly received.

The jaw members extend downwardly from an integral planar base 64 having two sideways outwardly projecting planar ears. The ears are slippedly removedly inserted into the mounting shoe formed on the base of the cabinet.

An electrical power cable 66 is operably connected from the electrical circuit assembly to a source of electrical power (not shown) such as the vehicle's electrical system.

Figure 6:
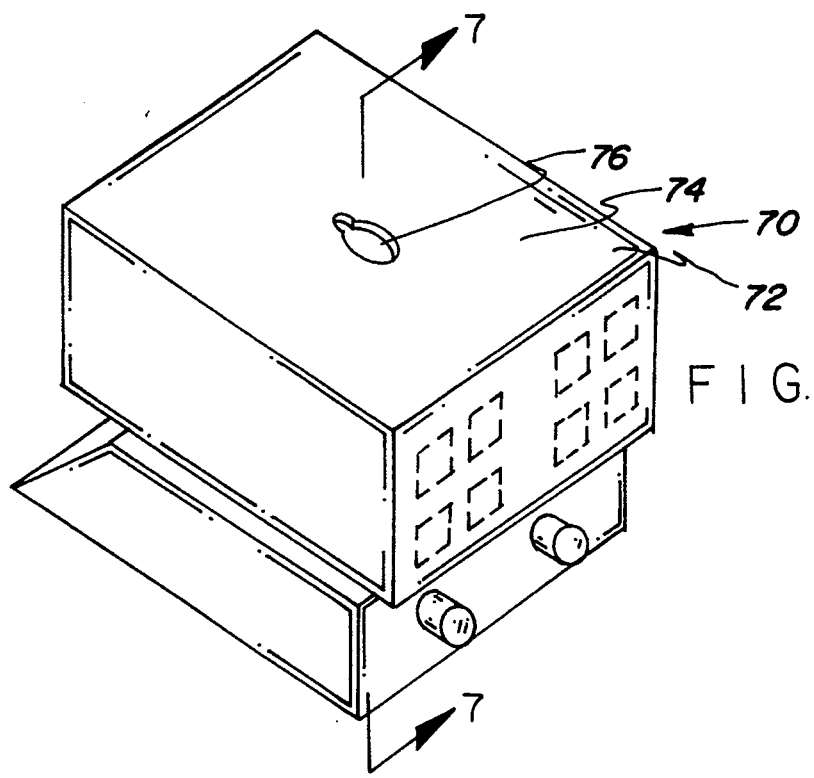
FIG. 6 is a perspective view of a first modification of the invention which adds a clock disguise depicted in a deployed position.
Figure 7:
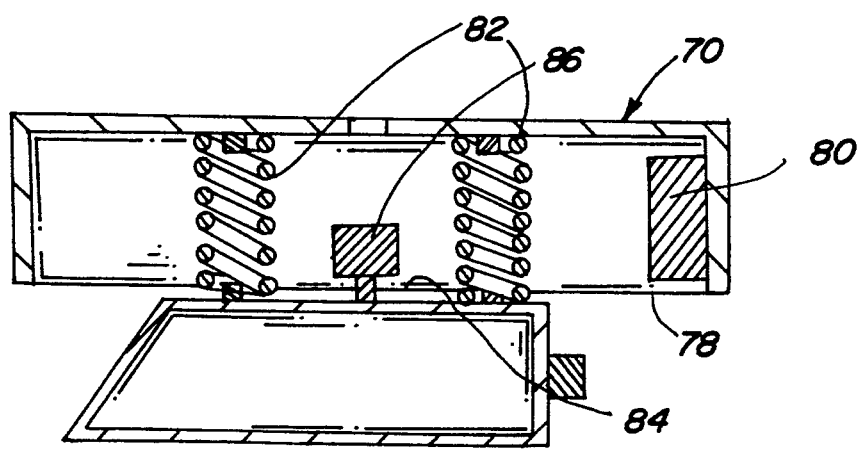
FIG. 7 is a sectional view of the first modification of the invention of FIG. 6 taken along the line 7—7.

Referring to FIGS. 6 and 7, a modification of the vehicle warning system 10 adds a disguise means 70 to preclude unwanted detection of the device by a person external to the vehicle wherein the device is mounted. The disguise means comprises a box 72 having an opaque top 74 with a centrally located keyhole 76 therethrough. The box also has opaque sides, an opaque front, and an open bottom 78. The box additionally has a transparent back and inside dimensions substantially larger then the outside dimensions of the warning system cabinet.

The disguise means further includes a clock 80 fixedly attached inside the rear of the box whereby the clock's face may be viewed through the transparent box back.

The disguise means moreover includes attachment means to provide rapid deployment or concealment of the warning system. The attachment means comprises a plurality of resilient members 82, such as compression coil springs, fixedly attached at one end to the top of the warning system enclosure.

The resilient members are fixedly attached at the other end to the inside of the disguise box whereby the warning system enclosure is held biased outside and below the disguise box in a deployed ready-for-use state. The resilient members have a compressibility such that the warning system enclosure may manually be pushed into the disguise box through the open bottom of the disguise box whereby the warning system enclosure is concealed within what appears to be a simple clock.

The disguise means also includes securement means to hold the warning system enclosure concealed inside the disguise box whereby the resilient members are held compressed. The securement means includes a shaft having a diameter essentially the same or smaller than the diameter of the keyhole. The shaft is rotationally attached at one end to the top of the warning system enclosure. The securement means also includes a knob 86 having a diameter essentially the same as the diameter of the keyhole and being fixedly collinearly attached to the free end of the shaft. The knob also has a key extending radially therefrom. The knob being operationally cooperative with the keyhole such that when the warning system enclosure is manually pushed into the disguise box, overcoming the bias of the resilient members, the knob extends through the keyhole whereby the knob may be rotated so the key is misaligned with the keyhole whereby releasably locking the warning system enclosure inside the disguise box.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A new and improved vehicle warning system for warning on-coming motorists of an important road condition and the approximate distance to the road condition, by use of a visual signalling device attached inside the windshield of the signaller's vehicle, the vehicle warning system comprising:

an electrical circuit assembly having a plurality of front-facing different colored daylight-visible annunciator lamps thereon, the circuit assembly also having timer means for controlling the sequence and duration of the periods of lamp illumination whereby through selective periods of illuminating the different colored annunciator lamps an approximate distance to the important road condition being warned of may be ascertained by the oncoming motorist, the circuit assembly additionally having rear facing switch means for actuating and disabling the timer means;

enclosure means for housing the circuit assembly, the enclosure means comprising:

a cabinet having a top, sides, and a bottom, the cabinet being hollow, the cabinet having an angled open front approximately coplanar with a motor vehicle windshield whereby a hood is formed to shield annunciator lamp glare when the cabinet is mounted in a level position facing the inside of the windshield, the cabinet additionally having an open back, the cabinet further having means for mounting the circuit assembly; a front panel having a plurality of openings therethrough wherethrough the annunciator lamps are visible to the oncoming motorist, a rear panel having openings therethrough whereby the switch means may be activated;

clamp means for removedly securely attaching the enclosure means to a vehicle's inside rear-view mirror so the angled cabinet front is in close proximity to and approximately coplanar with the inside surface of the vehicle's windshield; and an electrical power cable being operably connected from the electrical circuit assembly to a source of electrical power.

2. The vehicle warning system of claim 1 and further including a disguise means for precluding unwanted detection thereof when mounted in the vehicle by a person external to the vehicle, the disguise means comprising:

a box having an opaque top with a centrally located keyhole therethrough, the box also having opaque sides, an opaque front, and an open bottom, the box additionally having a transparent back, the box having inside dimensions substantially larger then the outside dimensions of the enclosure means;

a clock fixedly attached inside the rear of the box whereby the clock's face may be viewed through the transparent box back;

attachment means to provide rapid deployment and concealment of the warning system, the attachment means comprising:

a plurality of resilient members formed of compression coil springs fixedly attached at one end to the top of the enclosure means, the resilient members being fixedly attached at the other end to the inside of the disguise box whereby the enclosure means is held biased outside and below the disguise box in a deployed ready-for-use state, the resilient members having a compressibility such that the enclosure means may manually by pushed into the disguise box whereby the enclosure means is concealed within what appears to be a simple clock; and securement means to hold the enclosure means concealed inside the disguise box whereby the resilient members are held compressed, the securement means comprising a shaft having a diameter essentially no greater than the diameter of the keyhole, the shaft being rotationally attached at one end to the top of the enclosure means and a knob having a diameter essentially the same as the diameter of the keyhole, the knob being fixedly collinearly attached to the free end of the shaft, the knob also having a key extending radially therefrom, the knob being operationally cooperative with the keyhole such that when the enclosure means is pushed into the disguise box the knob extends through the keyhole whereby the knob may be rotated so the key is misaligned with the keyhole whereby locking the enclosure means in a concealed state.

* * * * *